US012424392B2

(12) United States Patent
Tanaka

(10) Patent No.: US 12,424,392 B2
(45) Date of Patent: Sep. 23, 2025

(54) ELECTROLYTIC CAPACITOR AND METHOD FOR MANUFACTURING ELECTROLYTIC CAPACITOR

(71) Applicant: Murata Manufacturing Co., Ltd., Nagaokakyo (JP)

(72) Inventor: Yasuo Tanaka, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 302 days.

(21) Appl. No.: 17/955,628

(22) Filed: Sep. 29, 2022

(65) Prior Publication Data

US 2023/0043077 A1 Feb. 9, 2023

Related U.S. Application Data

(63) Continuation of application No. PCT/JP2021/012584, filed on Mar. 25, 2021.

(30) Foreign Application Priority Data

Apr. 10, 2020 (JP) .................................. 2020-071311

(51) Int. Cl.
*H01G 9/15* (2006.01)
*H01G 9/042* (2006.01)
(Continued)

(52) U.S. Cl.
CPC ............ *H01G 9/15* (2013.01); *H01G 9/0425* (2013.01); *H01G 9/048* (2013.01); *H01G 9/10* (2013.01)

(58) Field of Classification Search
CPC ........ H01G 9/10; H01G 9/048; H01G 9/0425; H01G 9/15
See application file for complete search history.

(56) References Cited

U.S. PATENT DOCUMENTS 4,085,435 A * 4/1978 Galvagni ................. H01G 9/08
174/521
4,093,972 A * 6/1978 Voyles .................. H01G 9/012
29/25.03
(Continued)

FOREIGN PATENT DOCUMENTS

JP 05090092 A * 4/1993
JP 06-252010 A 9/1994
(Continued)

OTHER PUBLICATIONS

International Search Report in PCT/JP2021/012580, mailed Jun. 29, 2021, 3 pages.
(Continued)

*Primary Examiner* — David M Sinclair
(74) *Attorney, Agent, or Firm* — ArentFox Schiff LLP

(57) ABSTRACT

An electrolytic capacitor including: a resin molding including a capacitor element with an anode, a dielectric layer, and a cathode, and a sealing resin sealing the capacitor element; a first external electrode on a first end surface; and a second external electrode connected to the cathode at a second end surface and including a first electrode portion on a first side surface and having a first electrode end in contact with the first side surface and closest to the first end surface in the length direction, and, when viewed in a thickness direction, a region where the capacitor element is opposite to the first electrode portion in a width direction includes a first region where a distance in the width direction between the capacitor element and the first electrode portion is shorter than a distance in the width direction between the capacitor element and the first electrode end.

15 Claims, 6 Drawing Sheets

(51) Int. Cl.
  *H01G 9/048* (2006.01)
  *H01G 9/10* (2006.01)

(56) References Cited

U.S. PATENT DOCUMENTS

| | | | |
|---|---|---|---|
| 6,563,693 B2 | 5/2003 | Nakada et al. | |
| 2003/0184955 A1* | 10/2003 | Matsumoto | H01G 9/042 361/523 |
| 2009/0185331 A1 | 7/2009 | Kurokawa et al. | |
| 2016/0071654 A1 | 3/2016 | Kimura et al. | |
| 2017/0140877 A1 | 5/2017 | Kuromi | |
| 2020/0273628 A1 | 8/2020 | Suzuki et al. | |
| 2022/0310327 A1* | 9/2022 | Tani | H01G 9/14 |

FOREIGN PATENT DOCUMENTS

| | | | |
|---|---|---|---|
| JP | 06275477 A * | 9/1994 | |
| JP | H09270360 A | 10/1997 | |
| JP | 11026298 A * | 1/1999 | |
| JP | 11026309 A * | 1/1999 | |
| JP | 2005-005310 A | 1/2005 | |
| JP | 2006128283 A | 5/2006 | |
| JP | 2009295605 A | 12/2009 | |
| JP | 2017098297 A | 6/2017 | |
| JP | 2018082008 A | 5/2018 | |
| WO | 2014188833 A1 | 11/2014 | |
| WO | 2019087692 A1 | 5/2019 | |

OTHER PUBLICATIONS

International Search Report in PCT/JP2021/012584, mailed Jun. 29, 2021, 3 pages.

\* cited by examiner

ELECTROLYTIC CAPACITOR AND METHOD FOR MANUFACTURING ELECTROLYTIC CAPACITOR

CROSS REFERENCE TO RELATED APPLICATIONS

The present application is a continuation of International application No. PCT/JP2021/012584, filed Mar. 25, 2021, which claims priority to Japanese Patent Application No. 2020-071311, filed Apr. 10, 2020, the entire contents of each of which are incorporated herein by reference.

FIELD OF THE INVENTION

The present invention relates to an electrolytic capacitor and a method of producing an electrolytic capacitor.

BACKGROUND OF THE INVENTION

An electrolytic capacitor such as a solid electrolytic capacitor is produced by, for example, forming a dielectric layer on a surface of an anode made of a valve-action metal and subsequently forming a cathode opposite to the anode via the dielectric layer.

For example, Patent Literature 1 discloses a solid electrolytic capacitor including: a flat plate-like capacitor element including an anode portion and a cathode portion; an anode terminal on which the anode portion is disposed; a cathode terminal on which the cathode portion is disposed; and a cathode connection body along a side surface of the cathode portion and fixed to the cathode terminal, wherein the anode portion includes an anode portion projecting from an extension of the side surface of the cathode portion, an insulator portion is formed in contact with the anode portion on the side adjacent to the cathode portion, and the insulator portion faces an end of the cathode connection body on a line parallel to a line connecting the anode portion and the cathode portion.

Patent Literature 1: JP 2009-295605 A

SUMMARY OF THE INVENTION

In an electrolytic capacitor such as a solid electrolytic capacitor, usually, capacitor elements are sealed by a sealing resin for protecting the capacitor elements from oxygen, moisture, and the like to ensure reliability. A thick sealing resin is required for ensuring reliability. However, an increase in the thickness of the sealing resin in an electrolytic capacitor of a predetermined size involves a decrease in the effective area of the capacitor elements, hindering an increase in the capacitance. In other words, increasing the capacitance while ensuring reliability is not feasible in conventional electrolytic capacitors. This issue is noticeable when attempting to miniaturize electrolytic capacitors.

The present invention attempts to solve the above issue and aims to provide an electrolytic capacitor capable of having a higher capacitance while ensuring reliability. The present invention also provides a method of producing the electrolytic capacitor.

An electrolytic capacitor of the present invention includes: a resin molding that includes a capacitor element including an anode having a porous portion at a surface thereof, a dielectric layer on a surface of the porous portion, and a cathode opposite to the anode via the dielectric layer, a sealing resin sealing the capacitor element, a first end surface and a second end surface opposite to each other in a length direction of the resin molding, and a first side surface and a second side surface opposite to each other in a width direction perpendicular to the length direction of the resin molding; a first external electrode on the first end surface and connected to the anode exposed at the first end surface of the resin molding; and a second external electrode connected to the cathode exposed at the second end surface of the resin molding, wherein the second external electrode further includes a first electrode portion extending on the first side surface of the resin molding, the first electrode portion includes a first electrode end at a position in contact with the first side surface of the resin molding and closest to the first end surface of the resin molding in the length direction of the resin molding, and when viewed in a thickness direction perpendicular to the length direction and the width direction, a region where the capacitor element is opposite to the first electrode portion in the width direction includes a first region where a distance in the width direction between the capacitor element and the first electrode portion is shorter than a distance in the width direction between the capacitor element and the first electrode end.

A method of producing an electrolytic capacitor of the present invention includes: forming a capacitor element by sequentially forming a dielectric layer and a cathode on a surface of a porous portion of an anode having a shape with a main portion thereof extending in a length direction of the anode and a first protrusion protruding from the main portion in a width direction of the anode perpendicular to the length direction; sealing the capacitor element with a sealing resin to form a resin molding having a first end surface and a second end surface opposite to each other in the length direction of the resin molding, and a first side surface and a second side surface opposite to each other in the width direction of the resin molding; forming a first external electrode on the first end surface of the resin molding and connected to the anode exposed at the first end surface; and forming a second external electrode extending from the second end surface of the resin molding to a portion of the first side surface and connected to the cathode exposed at the second end surface, wherein the second external electrode is formed in such a manner that a first electrode portion opposite in the width direction to the first protrusion in the capacitor element is formed on the first side surface of the resin molding so that the first electrode portion includes a first electrode end at a position in contact with the first side surface of the resin molding and closest to the first end surface of the resin molding in the length direction, and a region where the capacitor element is opposite to the first electrode portion in the width direction includes a first region where a distance in the width direction between the capacitor element and the first electrode portion is shorter than a distance in the width direction between the capacitor element and the first electrode end when viewed in a thickness direction perpendicular to the length direction and the width direction of the resin molding.

The present invention can provide an electrolytic capacitor capable of having a higher capacitance while ensuring reliability. The present invention can also provide a method of producing the electrolytic capacitor.

DETAILED DESCRIPTION OF THE PREFERRED EMBODIMENTS

Figure 1:
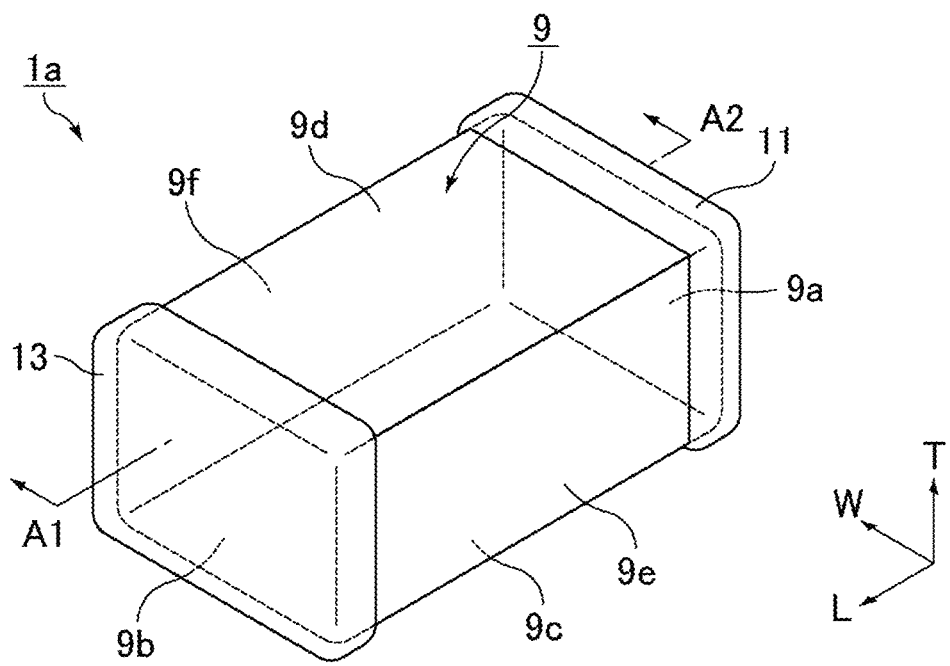
FIG. 1 is a schematic perspective view showing an electrolytic capacitor of Embodiment 1 of the present invention.

The electrolytic capacitor of the present invention and the method of producing an electrolytic capacitor of the present invention are described below. The present invention is not limited to the following preferred embodiments and may be suitably modified without departing from the gist of the present invention. Combinations of preferred features described in the following preferred embodiments are also within the scope of the present invention.

The following embodiments are examples, and features of different embodiments can be partially exchanged or combined with each other. In the second embodiment and subsequent embodiments, a description of features common to the first embodiment is omitted, and only different points are described. In particular, similar effects by similar features are not mentioned in each embodiment. In the following description, the electrolytic capacitor of each embodiment is simply referred to as "the electrolytic capacitor of the present invention" when no distinction is made between the embodiments.

Embodiment 1

The electrolytic capacitor of the present invention includes: a resin molding that includes a capacitor element including an anode having a porous portion at a surface thereof, a dielectric layer on a surface of the porous portion, and a cathode opposite to the anode via the dielectric layer, a sealing resin sealing the capacitor element, a first end surface and a second end surface opposite to each other in a length direction of the resin molding, and a first side surface and a second side surface opposite to each other in a width direction perpendicular to the length direction of the resin molding; a first external electrode on the first end surface and connected to the anode exposed at the first end surface of the resin molding; and a second external electrode connected to the cathode exposed at the second end surface of the resin molding, wherein the second external electrode further includes a first electrode portion extending on the first side surface of the resin molding, the first electrode portion includes a first electrode end at a position in contact with the first side surface of the resin molding and closest to the first end surface of the resin molding in the length direction of the resin molding, and when viewed in a thickness direction perpendicular to the length direction and the width direction, a region where the capacitor element is opposite to the first electrode portion in the width direction includes a first region where a distance in the width direction between the capacitor element and the first electrode portion is shorter than a distance in the width direction between the capacitor element and the first electrode end.

In the electrolytic capacitor of the present invention, the region where the capacitor element is opposite to the first electrode portion in the width direction may include, in the length direction, the first region at a position closer to the second end surface of the resin molding and a second region at a position away from the second end surface of the resin molding and adjacent to the first region and including the first electrode end; in the first region, the distance in the width direction between the capacitor element and the first electrode portion may be constant in the length direction; and in the second region, the distance in the width direction between the capacitor element and the first electrode portion may be constant in the length direction. In the electrolytic capacitor of the present invention, the second external electrode may further include a second electrode portion extending on the second side surface of the resin molding; the second electrode portion may include a second electrode end at a position in contact with the second side surface of the resin molding and closest to the first end surface of the resin molding in the length direction of the resin molding; and when viewed in the thickness direction, a region where the capacitor element is opposite to the second electrode portion in the width direction may include a third region where a distance in the width direction between the capacitor element and the second electrode portion is shorter than a distance in the width direction between the capacitor element and the second electrode end. In the electrolytic capacitor of the present invention, the region where the capacitor element is opposite to the second electrode portion in the width direction may include, in the length direction, the third region at a position closer to the second end surface of the resin molding and a fourth region at a position away from the second end surface of the resin molding and adjacent to the third region and including the second electrode end; in the third region, the distance in the width direction between the capacitor element and the second electrode portion may be constant in the length direction; and in the fourth region, the distance in the width direction between the capacitor element and the second electrode portion may be constant in the length direction. Such a case is described below as an electrolytic capacitor of Embodiment 1 of the present invention.

FIG. 1 is a schematic perspective view showing an electrolytic capacitor of Embodiment 1 of the present invention. As shown in FIG. 1, an electrolytic capacitor 1*a* includes a resin molding 9, a first external electrode 11, and a second external electrode 13.

Herein, a length direction, a width direction, and a thickness direction are directions indicated by an arrow L, an arrow W, and an arrow T, respectively, as shown in FIG. 1 and elsewhere. Here, the length direction L, the width direction W, and the thickness direction T are perpendicular to one another.

Herein, in the electrolytic capacitor, a plane along the length direction L and the thickness direction T is referred to as an "LT plane", a plane along the length direction L and the width direction W is referred to as an "LW plane", and a plane along the width direction W and the thickness direction T is referred to as a "WT plane".

The resin molding 9 is substantially cuboidal, and includes a first end surface 9a and a second end surface 9b (WT planes) opposite to each other in the length direction L; a bottom surface 9c and a top surface 9d (LW planes) opposite to each other in the thickness direction T, and a first side surface 9e and a second side surface 9f (LT planes) opposite to each other in the width direction W.

The first end surface 9a and the second end surface 9b of the resin molding 9 may not be exactly perpendicular to the length direction L. The bottom surface 9c and the top surface 9d of the resin molding 9 may not be exactly perpendicular to the thickness direction T. The first side surface 9e and the second side surface 9f of the resin molding 9 may not be exactly perpendicular to the width direction W.

The first external electrode 11 is on the first end surface 9a of the resin molding 9. Preferably, the first external electrode 11 extends from the first end surface 9a of the resin molding 9 to one or both of the first side surface 9e and the second side surface 9f. Preferably, the first external electrode 11 extends from the first end surface 9a of the resin molding 9 to one or both of the bottom surface 9c and the top surface 9d.

The second external electrode 13 is on the second end surface 9b of the resin molding 9. The second external electrode 13 extends from the second end surface 9b of the resin molding 9 to the first side surface 9e. Preferably, the second external electrode 13 further extends from the second end surface 9b of the resin molding 9 to a portion of the second side surface 9f. In other words, preferably, the second external electrode 13 extends from the second end surface 9b of the resin molding 9 to a portion of the first side surface 9e and a portion of the second side surface 9f. Preferably, the second external electrode 13 extends from the second end surface 9b of the resin molding 9 to one or both of the bottom surface 9c and the top surface 9d.

Figure 2:
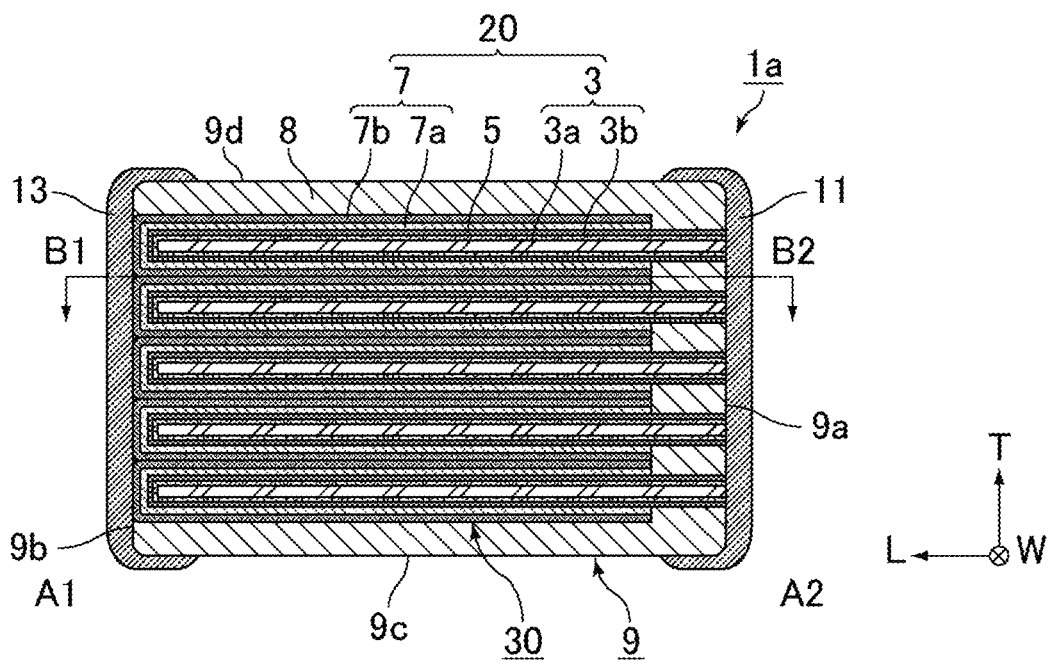
FIG. 2 is a schematic cross-sectional view taken along a line A1-A2 in FIG. 1.

FIG. 2 is a schematic cross-sectional view taken along a line A1-A2 in FIG. 1. As shown in FIG. 2, the resin molding 9 includes multiple capacitor elements 20 and a sealing resin 8 sealing the multiple capacitor elements 20. More specifically, the resin molding 9 includes a stack 30 of the multiple capacitor elements 20 stacked in the thickness direction T and the sealing resin 8 sealing the stack 30. In the stack 30, the capacitor elements 20 may be bonded to each other via a conductive adhesive.

Preferably, the resin molding 9 includes multiple capacitor elements 20 but may include one capacitor element 20.

The capacitor element 20 includes an anode 3, a dielectric layer 5, and a cathode 7.

The anode 3 includes a valve-action metal substrate 3a at a center thereof and a porous portion 3b at a surface thereof.

Examples of valve-action metal of the valve-action metal substrate 3a include elemental metals such as aluminum, tantalum, niobium, titanium, zirconium, magnesium, and silicon, and alloys containing at least one of these metals. In particular, aluminum and an aluminum alloy are preferred.

The valve-action metal substrate 3a is preferably a flat plate, more preferably foil.

Preferably, the porous portion 3b is an etched layer of the valve-action metal substrate 3a etched with hydrochloric acid or the like.

The thickness of the valve-action metal substrate 3a before etching is preferably 60 μm to 180 μm. After etching, the thickness of the non-etched core of the valve-action metal substrate 3a is preferably 10 μm to 70 μm. The thickness of the porous portion 3b is designed according to the withstand voltage and capacitance required for the electrolytic capacitor 1a. In the cross section shown in FIG. 2, the total thickness of the porous portions 3b on both sides of the valve-action metal substrate 3a is preferably 10 μm to 120 μm. The porous portion 3b may be on one of main surfaces of the valve-action metal substrate 3a.

The anode 3 is exposed at the first end surface 9a of the resin molding 9 and connected to the first external electrode 11.

The dielectric layer 5 is on a surface of the porous portion 3b.

Preferably, the dielectric layer 5 is made of an oxide film of the valve-action metal. For example, when the valve-action metal substrate 3a is aluminum foil, the valve-action metal substrate 3a is anodized in an aqueous solution containing boric acid, phosphoric acid, adipic acid, a sodium salt or an ammonium salt thereof, or the like, whereby an oxide film that turns into the dielectric layer 5 is formed. The dielectric layer 5 is formed along the surface of the porous portion 3b, whereby pores (recesses) are formed in the dielectric layer 5.

The thickness of the dielectric layer 5 is designed according to the withstand voltage, capacitance, and the like required for the electrolytic capacitor 1a. The thickness is preferably 10 nm to 100 nm.

The cathode 7 is opposite to the anode 3 via the dielectric layer 5.

The cathode 7 includes a solid electrolyte layer 7a on a surface of the dielectric layer 5. Preferably, the cathode 7 includes a conductive layer 7b on a surface of the solid electrolyte layer 7a. The electrolytic capacitor 1a includes the solid electrolyte layer 7a as a part of the cathode 7 and is thus regarded as a solid electrolytic capacitor.

The electrolytic capacitor of the present invention may be an electrolytic capacitor including an electrolytic solution instead of a solid electrolyte; or may be an electrolytic capacitor including a solid electrolyte and an electrolytic solution.

Examples of constituent materials of the solid electrolyte layer 7a include a conductive polymer having a pyrrole, thiophene, or aniline skeleton. A conductive polymer having a thiophene skeleton is, for example, poly(3,4-ethylenedioxythiophene) (PEDOT), and may be PEDOT:PSS which is a complex with a dopant (poly(styrene sulfonate) (PSS)).

The solid electrolyte layer 7a is formed by, for example, a method in which a polymerized film of poly(3,4-ethylenedioxythiophene) or the like is formed on a surface of the dielectric layer 5 using a treatment liquid containing a monomer such as 3,4-ethylenedioxythiophene, or a method in which a dispersion of a polymer such as poly(3,4-ethylenedioxythiophene) is applied to the surface of the dielectric layer 5 and then dried. The solid electrolyte layer 7a is formed in a predetermined region by applying the treatment liquid or dispersion to the surface of the dielectric layer 5 by a method such as immersion coating, screen printing, transfer printing, inkjet printing, dispensing, or spray coating. Preferably, the solid electrolyte layer 7a is obtained by first forming a solid electrolyte layer for an inner layer for filling the pores (recesses) of the dielectric layer 5 and then forming a solid electrolyte layer for an outer layer for covering the entire dielectric layer 5.

The thickness of the solid electrolyte layer 7a is preferably 2 μm to 20 μm.

The conductive layer 7b is formed by applying a conductive paste such as a carbon paste, a graphene paste, or a silver paste to a surface of the solid electrolyte layer 7a by a method such as immersion coating, screen printing, transfer printing, inkjet printing, dispensing, or spray coating.

Preferably, the conductive layer 7b is a carbon layer, a graphene layer, or a silver layer formed as described above. The conductive layer 7b may be a composite layer in which a silver layer is disposed on a carbon layer or a graphene layer, or a mixed layer containing a mixture of a carbon paste or a graphene paste with a silver paste.

The thickness of the conductive layer 7b is preferably 2 μm to 20 μm.

The cathode 7 (here, the conductive layer 7b) is exposed at the second end surface 9b of the resin molding 9 and connected to the second external electrode 13. In other words, the conductive layer 7b is directly connected to the second external electrode 13, instead of being led out to the second external electrode 13 by a cathode lead-out layer or the like.

The sealing resin 8 contains at least a resin, and preferably contains a resin and filler.

Preferred examples of the resin include an epoxy resin, a phenolic resin, a polyimide resin, a silicone resin, a polyamide resin, and a liquid crystal polymer.

Preferred examples of the filler include silica particles, alumina particles, and metal particles.

Preferably, the sealing resin 8 includes a material containing a solid epoxy resin, a phenolic resin and silica particles.

In use of the solid sealing resin 8, the resin molding 9 is preferably formed by a method that uses a resin mold such as a compression mold or a transfer mold, with a compression mold being more preferred. In use of the liquid sealing resin 8, the resin molding is preferably formed by a method that uses a dispenser or printing. In particular, preferably, the stack 30 is sealed by the sealing resin 8 using a compression mold to produce the resin molding 9.

The resin molding 9 may have rounded corners. The corners of the resin molding 9 may be rounded by barrel polishing, for example.

The first external electrode 11 is connected to the anode 3 exposed at the first end surface 9a of the resin molding 9.

The second external electrode 13 is connected to the cathode 7 exposed at the second end surface 9b of the resin molding 9.

Preferably, the first external electrode 11 and the second external electrode 13 are each formed by at least one method selected from the group consisting of immersion coating, screen printing, transfer printing, inkjet printing, dispensing, spray coating, brush coating, drop casting, electrostatic coating, plating, and sputtering.

Preferably, the first external electrode 11 includes a resin electrode layer containing a conductive component and a resin component. The resin component in the first external electrode 11 improves the adhesion between the first external electrode 11 and the sealing resin 8, resulting in higher reliability.

Preferably, the second external electrode 13 includes a resin electrode layer containing a conductive component and a resin component. The resin component in the second external electrode 13 improves the adhesion between the second external electrode 13 and the sealing resin 8, resulting in higher reliability.

Preferably, the conductive component mainly contains an elemental metal such as silver, copper, nickel, or tin or an alloy containing at least one of these metals, for example.

Preferably, the resin component mainly contains an epoxy resin, a phenolic resin, or the like.

The resin electrode layers are formed, for example, by a method such as immersion coating, screen printing, transfer printing, inkjet printing, dispensing, spray coating, brush coating, drop casting, or electrostatic coating. In particular, preferably, the resin electrode layers are printed resin electrode layers formed by applying a conductive paste by screen printing. When the resin electrode layers are formed by applying a conductive paste by screen printing, the first external electrode 11 and the second external electrode 13 tend to be flat, as compared to when the resin electrode layers are formed by applying a conductive paste by immersion coating. In other words, the thickness of the first external electrode 11 and the thickness of the second external electrode 13 tend to be uniform.

When the second external electrode 13 includes a resin electrode layer, preferably, the cathode 7 includes a resin electrode layer. More specifically, preferably, the cathode 7 includes the conductive layer 7b such as a carbon layer, a graphene layer, or a silver layer as the resin electrode layer. The resin components in both the second external electrode 13 and the cathode 7 improve the adhesion between the second external electrode 13 and the cathode 7, resulting in higher reliability.

One or both of the first external electrode 11 and the second external electrode 13 may include a plating layer formed by plating. Examples of the plating layer include a zinc-silver-nickel layer, a silver-nickel layer, a nickel layer, a zinc-nickel-gold layer, a nickel-gold layer, a zinc-nickel-copper layer, and a nickel-copper layer. Preferably, such a plating layer is sequentially overlaid by, for example, a copper plating layer, a nickel plating layer, and a tin plating layer (alternatively, one or some of these plating layers may be excluded).

One or both of the first external electrode 11 and the second external electrode 13 may include a resin electrode layer and a plating layer. For example, the first external electrode 11 may include a resin electrode layer connected to the anode 3 and an outer plating layer on a surface of the resin electrode layer on the side opposite to the anode 3. The first external electrode 11 may include an inner plating layer connected to the anode 3, a resin electrode layer covering the inner plating layer, and an outer plating layer on the surface of the resin electrode layer away from the anode 3.

Figure 3:
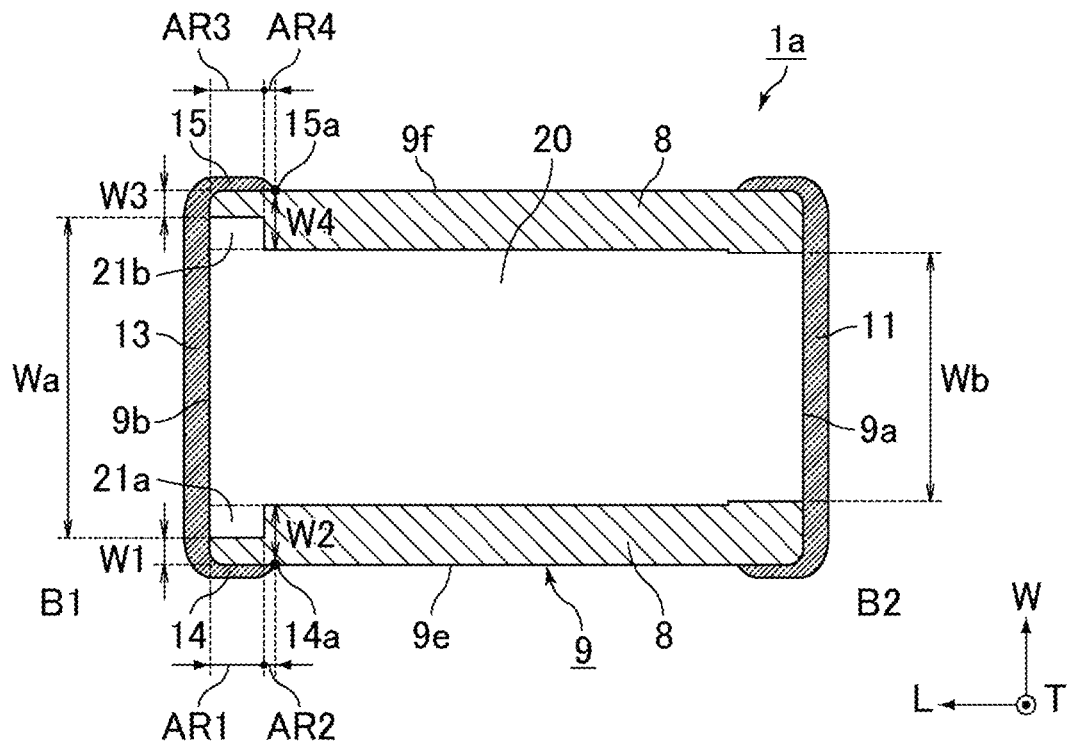
FIG. 3 is a schematic cross-sectional view taken along a line B1-B2 in FIG. 2.

FIG. 3 is a schematic cross-sectional view taken along a line B1-B2 in FIG. 2. In FIG. 3, the anode 3, the dielectric layer 5, and the cathode 7 are omitted to focus the shape of the capacitor element 20 in the vicinity of the second external electrode 13.

As shown in FIG. 3, the second external electrode 13 includes a first electrode portion 14 on the first side surface 9e of the resin molding 9. The first electrode portion 14 includes a first electrode end 14a at a position in contact with the first side surface 9e of the resin molding 9 and closest to the first end surface 9a of the resin molding 9 in the length direction L.

When viewed in the thickness direction T, a region where the capacitor element 20 is opposite to the first electrode portion 14 in the width direction W includes, in the length direction L, a first region AR1 at a position closer to the second end surface 9b of the resin molding 9 and a second region AR2 at a position away from the second end surface 9b of the resin molding 9 and adjacent to the first region AR1 and including the first electrode end 14a.

In the first region AR1, a distance W1 in the width direction W between the capacitor element 20 and the first electrode portion 14 is shorter than a distance W2 in the width direction W between the capacitor element 20 and the first electrode end 14a. Since the electrolytic capacitor 1a includes the first region AR1, the capacitor element 20 is enlarged in the width direction W by an amount corresponding to a protrusion 21a. This increases the effective area of the capacitor element 20, thus increasing the capacitance. Meanwhile, in the electrolytic capacitor 1a, the capacitor element 20 is covered by the sealing resin 8, the first external electrode 11, and the second external electrode 13. Here, in the first region AR1, the sealing resin 8 is shortened in the width direction W as the capacitor element 20 is enlarged in the width direction W by an amount corresponding to the protrusion 21a, and the sealing resin 8 is covered by the first electrode portion 14. Thus, the capacitor element 20 is protected from oxygen, moisture, and the like, regardless of the enlargement of the capacitor element 20 in the width direction W by an amount corresponding to the protrusion 21a. Thus, the capacitance can be increased while reliability is ensured owing to the first region AR1 in the electrolytic capacitor 1a.

The second external electrode 13 includes a second electrode portion 15 on the second side surface 9f of the resin molding 9. The second electrode portion 15 includes a second electrode end 15a at a position in contact with the second side surface 9f of the resin molding 9 and closest to the first end surface 9a of the resin molding 9 in the length direction L.

When viewed in the thickness direction T, a region where the capacitor element 20 is opposite to the second electrode portion 15 in the width direction W includes, in the length direction L, a third region AR3 closer to the second end surface 9b of the resin molding 9 and a fourth region AR4 at a position away from the second end surface 9b of the resin molding 9 and adjacent to the third region AR3 and including the second electrode end 15a.

In the third region AR3, a distance W3 in the width direction W between the capacitor element 20 and the second electrode portion 15 is shorter than a distance W4 in the width direction W between the capacitor element 20 and the second electrode end 15a. Since the electrolytic capacitor 1a includes the third region AR3, the capacitor element 20 is enlarged in the width direction W by an amount corresponding to a protrusion 21b. This increases the effective area of the capacitor element 20, thus increasing the capacitance. Here, in the third region AR3, the sealing resin 8 is shortened in the width direction W as the capacitor element 20 is enlarged in the width direction W by an amount corresponding to the protrusion 21b, and the sealing resin 8 is covered by the second electrode portion 15. Thus, the capacitor element 20 is protected from oxygen, moisture, and the like, regardless of the enlargement of the capacitor element 20 in the width direction W by an amount corresponding to the protrusion 21b. Thus, the capacitance can be increased while reliability is ensured owing to the third region AR3 in the electrolytic capacitor 1a.

In the electrolytic capacitor 1a, the capacitance can be increased while reliability is ensured owing to the first region AR1 and the third region AR3. Such an effect can be similarly achieved when the size of the electrolytic capacitor 1a is small.

The third region AR3 may not be present as long as the first region AR1 is present. Also in this case, the capacitance can be increased while reliability is ensured owing to the first region AR1.

In the electrolytic capacitor 1a, in the first region AR1, the distance W1 in the width direction W between the capacitor element 20 and the first electrode portion 14 is constant in the length direction L. In the first region AR1, the distance W1 in the width direction W between the capacitor element 20 and the first electrode portion 14 is more than zero. In other words, in the first region AR1, the capacitor element 20 is not connected to the second external electrode 13 (here, the first electrode portion 14) at the first side surface 9e of the resin molding 9.

In the electrolytic capacitor 1a, in the second region AR2, the distance in the width direction W between the capacitor element 20 and the first electrode portion 14 is constant in the length direction L. More specifically, the distance is constant and the same as the distance W2 in the width direction W between the capacitor element 20 and the first electrode end 14a.

In the electrolytic capacitor 1a, since the first region AR1 and the second region AR2 are formed as described above, the capacitor element 20 has an outer shape with steps as shown in FIG. 3 in the region where the capacitor element 20 is opposite to the first electrode portion 14 in the width direction W.

In the electrolytic capacitor 1a, in the third region AR3, the distance W3 in the width direction W between the capacitor element 20 and the second electrode portion 15 is constant in the length direction L. In the third region AR3, the distance W3 in the width direction W between the capacitor element 20 and the second electrode portion 15 is more than zero. In other words, in the third region AR3, the capacitor element 20 is not connected to the second external electrode 13 (here, the second electrode portion 15) at the second side surface 9f of the resin molding 9.

In the electrolytic capacitor 1a, in the fourth region AR4, the distance in the width direction W between the capacitor element 20 and the second electrode portion 15 is constant in the length direction L. More specifically, the distance is constant and the same as the distance W4 between the capacitor element 20 and the second electrode end 15a in the width direction W.

In the electrolytic capacitor 1a, since the third region AR3 and the fourth region AR4 are formed as described above, the capacitor element 20 has an outer shape with steps as shown in FIG. 3 in the region where the capacitor element 20 is opposite to the second electrode portion 15 in the width direction W.

In terms of reliability and higher capacitance, the distance W1 is preferably more than 0% and 50% or less relative to the distance W2. The distance W3 is preferably more than 0% and 50% or less relative to the distance W4.

The distance W1 may be the same as or different from the distance W3. The distance W2 may be the same as or different from the distance W4.

When viewed in the thickness direction T, the capacitor element 20 has a shape enlarged in the vicinity of the second external electrode 13 by an amount corresponding to the protrusion 21a and the protrusion 21b in the width direction W. In each of the protrusion 21a and the protrusion 21b, the dielectric layer 5 and the cathode 7 are sequentially disposed on the surface of the porous portion 3b of the anode 3, as in other regions. Thus, the cathode 7 has an outer edge extending along an outer edge of the anode 3 when viewed in the thickness direction T. In the region where the capacitor element 20 is not opposite to the second external electrode 13 in the width direction W, the length in the width direction W of the anode 3 is constant in the length direction L.

Since the capacitor element 20 has the shape described above, a maximum length Wa in the width direction W of the capacitor element 20 in the region where the capacitor element 20 is opposite to the second external electrode 13 in the width direction W is greater than a maximum length Wb in the width direction W of the capacitor element 20 in the region where the capacitor element 20 is not opposite to the second external electrode 13 in the width direction W. Preferably, the maximum length Wa is the same as the distance in the width direction W between the first side surface 9e and the second side surface 9f of the resin molding 9 (here, the length in the width direction W of the second end surface 9b).

In the length direction L, the length of the second region AR2 is preferably more than 0% and 50% or less relative to the length of the first region AR1. In the length direction L, the length of the fourth region AR4 is preferably more than 0% and 50% or less relative to the length of the third region AR3.

In the length direction L, the length of the first region AR1 may be the same as or different from the length of the third region AR3.

While the electrolytic capacitor 1a includes one first region AR1 and one second region AR2, the electrolytic capacitor 1a may include multiple first regions AR1 and multiple second regions AR2. For example, when viewed in the thickness direction T, the region where the capacitor element 20 is opposite to the first electrode portion 14 in the width direction W may sequentially include the following regions toward the second end surface 9b of the resin molding 9 in the length direction L: the second region AR2, the first region AR1, and the second region AR2; or the second region AR2, the first region AR1, the second region AR2, and the first region AR1.

The electrolytic capacitor 1a includes one third region AR3 and one fourth region AR4, but electrolytic capacitor 1a may include multiple third regions AR3 and multiple fourth regions AR4. For example, when viewed in the thickness direction T, the region where the capacitor element 20 is opposite to the second electrode portion 15 in the width direction W may sequentially include the following regions toward the second end surface 9b of the resin molding 9 in the length direction L: the fourth region AR4, the third region AR3, and the fourth region AR4; or the fourth region AR4, the third region AR3, the fourth region AR4, and the third region AR3.

The method of producing an electrolytic capacitor of the present invention includes: forming a capacitor element by sequentially forming a dielectric layer and a cathode on a surface of a porous portion of an anode having a shape with a main portion thereof extending in a length direction of the anode and a first protrusion protruding from the main portion in a width direction of the anode perpendicular to the length direction; sealing the capacitor element with a sealing resin to form a resin molding having a first end surface and a second end surface opposite to each other in the length direction of the resin molding, and a first side surface and a second side surface opposite to each other in the width direction of the resin molding; forming a first external electrode on the first end surface of the resin molding and connected to the anode exposed at the first end surface; and forming a second external electrode extending from the second end surface of the resin molding to a portion of the first side surface and connected to the cathode exposed at the second end surface, wherein the second external electrode is formed in such a manner that a first electrode portion opposite in the width direction to the first protrusion in the capacitor element is formed on the first side surface of the resin molding so that the first electrode portion includes a first electrode end at a position in contact with the first side surface of the resin molding and closest to the first end surface of the resin molding in the length direction, and a region where the capacitor element is opposite to the first electrode portion in the width direction includes a first region where a distance in the width direction between the capacitor element and the first electrode portion is shorter than a distance in the width direction between the capacitor element and the first electrode end, when viewed in a thickness direction perpendicular to the length direction and the width direction of the resin molding.

In the method of producing an electrolytic capacitor of the present invention, the anode may have a shape including a second protrusion protruding from the main portion to a side thereof away from the first protrusion in the width direction, and the second external electrode may be formed in such a manner that a second electrode portion opposite in the width direction to the second protrusion in the capacitor element is formed on the second side surface of the resin molding so that the second electrode portion includes a second electrode end at a position in contact with the second side surface of the resin molding and closest to the first end surface of the resin molding in the length direction, and a region where the capacitor element is opposite to the second electrode portion in the width direction includes a second region where a distance in the width direction between the capacitor element and the second electrode portion is shorter than a distance in the width direction between the capacitor element and the second electrode end, when viewed in the thickness direction of the resin molding. Such a case is described below as a method of producing the electrolytic capacitor of Embodiment 1 of the present invention, i.e., a method of producing the electrolytic capacitor 1a shown in FIG. 1, FIG. 2, and FIG. 3.

Forming Resin Molding

Figure 4:
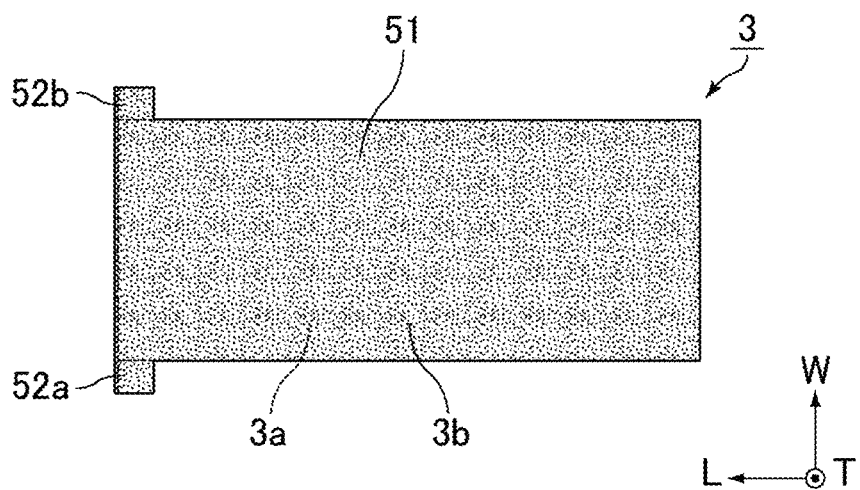
FIG. 4 is a schematic plan view showing an example of forming a resin molding in a method of producing the electrolytic capacitor of Embodiment 1 of the present invention.
Figure 5:
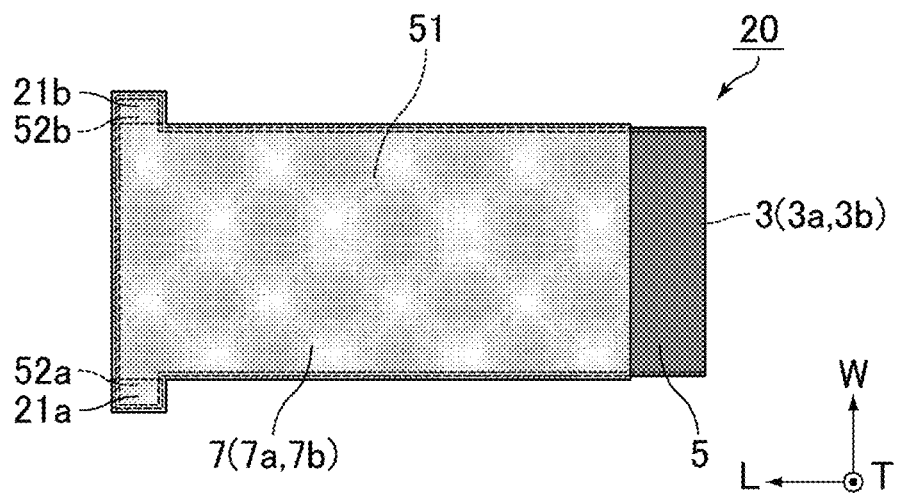
FIG. 5 is a schematic plan view showing an example of the forming a resin molding in the method of producing the electrolytic capacitor of Embodiment 1 of the present invention.
Figure 6:
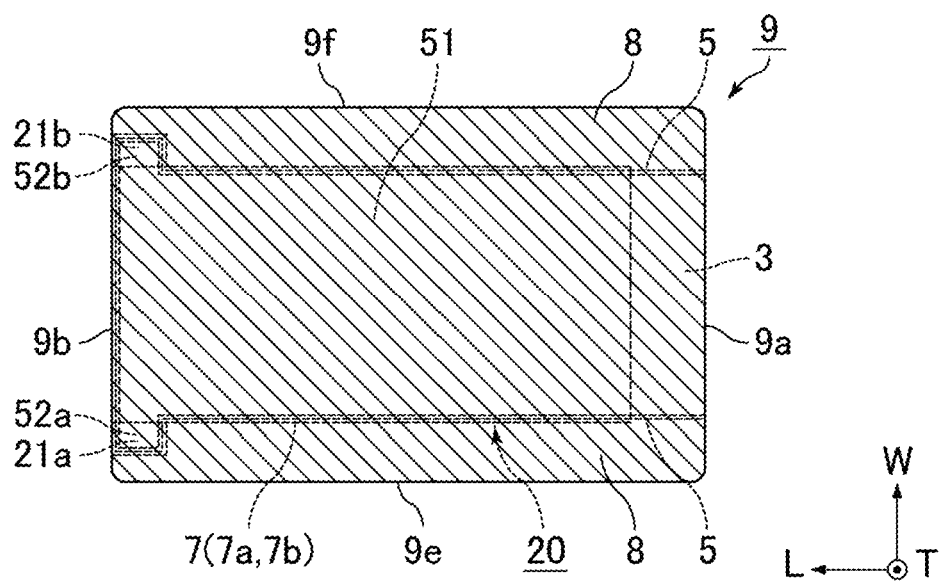
FIG. 6 is a schematic plan view showing an example of the forming a resin molding in the method of producing the electrolytic capacitor of Embodiment 1 of the present invention.

FIG. 4, FIG. 5, and FIG. 6 are each a schematic plan view showing an example of the forming a resin molding in the method of producing the electrolytic capacitor of Embodiment 1 of the present invention.

First, the valve-action metal substrate 3a including the porous portion 3b at the surface thereof is provided. Then, the valve-action metal substrate 3a is processed with laser or in a mold, for example, whereby the anode 3 as shown in FIG. 4 is formed which includes the porous portion 3b at the surface thereof and has a shape with a main portion 51 extending in the length direction L, a first protrusion 52a protruding in the width direction W from the main portion 51, and a second protrusion 52b protruding in the width direction W from the main portion 51 to a side away from the first protrusion 52a. The length in the width direction W of the main portion 51 is constant in the length direction L.

Next, the anode 3 is anodized to form the dielectric layer 5 on the surface of the porous portion 3b of the anode 3 and also on a cut surface of the anode 3. Then, the solid electrolyte layer 7a is formed on a surface of the dielectric layer 5 by a method such as immersion coating. Further, the conductive layer 7b is formed on a surface of the solid electrolyte layer 7a by a method such as immersion coating. As described above, the dielectric layer 5 and the cathode 7 including the solid electrolyte layer 7a and the conductive layer 7b are sequentially formed on the surface of the porous portion 3b of the anode 3, whereby the capacitor element 20 as shown in FIG. 5 is formed. When viewed in the thickness direction T, the capacitor element 20 includes the protrusion 21a corresponding to the first protrusion 52a and the protrusion 21b corresponding to the second protrusion 52b. When viewed in the thickness direction T, the outer edge of the cathode 7 extends along the outer edge of the anode 3.

Then, after multiple capacitor elements 20 are stacked, a compression mold or the like is used to seal the stack of the multiple capacitor elements 20 by the sealing resin 8, whereby the resin molding 9 as shown in FIG. 6 is formed. In forming the resin molding 9, the sealing resin 8 is sealed in such a manner that the anode 3 is exposed at the first end surface 9a and the cathode 7 is exposed at the second end surface 9b.

In this step, in forming the resin molding 9, the stack of the multiple capacitor elements 20 is sealed by the sealing resin 8, but one capacitor element 20 may be sealed by the sealing resin 8.

Forming First External Electrode

Figure 7:
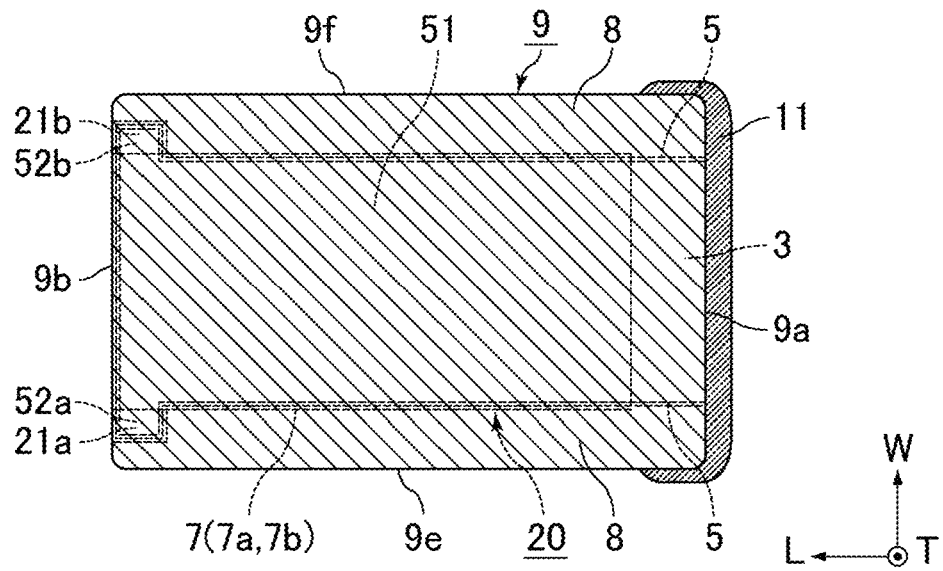
FIG. 7 is a schematic plan view showing an example of forming a first external electrode in the method of producing the electrolytic capacitor of Embodiment 1 of the present invention.

FIG. 7 is a schematic plan view showing an example of forming a first external electrode in the method of producing the electrolytic capacitor of Embodiment 1 of the present invention. As shown in FIG. 7, the first external electrode 11 connected to the anode 3 exposed at the first end surface 9a is formed on the first end surface 9a of the resin molding 9. Here, as shown in FIG. 1, FIG. 2, and FIG. 3, the first external electrode 11 is formed to extend from the first end surface 9a of the resin molding 9 to a portion of the bottom surface 9c, a portion of the top surface 9d, a portion of the first side surface 9e, and a portion of the second side surface 9f.

In this step, preferably, the first external electrode 11 is formed by at least one method selected from the group consisting of immersion coating, screen printing, transfer printing, inkjet printing, dispensing, spray coating, brush coating, drop casting, electrostatic coating, plating, and sputtering. Here, preferably, the first external electrode 11, more specifically, the resin electrode layer as the first external electrode 11, is formed using a conductive paste containing a conductive component and a resin component by immersion coating, screen printing, transfer printing, inkjet printing, dispensing, spray coating, brush coating, drop casting, or electrostatic coating.

Forming Second External Electrode

Figure 8:
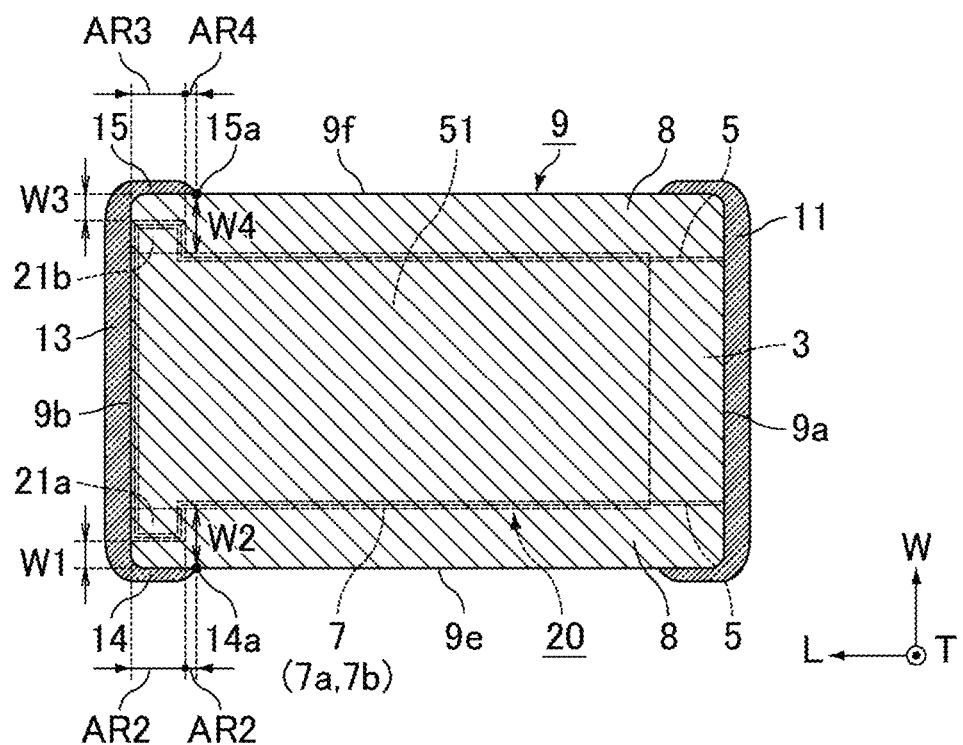
FIG. 8 is a schematic plan view showing an example of forming a second external electrode in the method of producing the electrolytic capacitor of Embodiment 1 of the present invention.

FIG. 8 is a schematic plan view showing an example of forming a second external electrode in the method of producing the electrolytic capacitor of Embodiment 1 of the present invention. As shown in FIG. 8, the second external electrode 13 connected to the cathode 7 exposed at the second end surface 9b is formed to extend from the second end surface 9b of the resin molding 9 to a portion of the first side surface 9e. Here, as shown in FIG. 1, FIG. 2, and FIG. 3, the second external electrode 13 is formed to extend from the second end surface 9b of the resin molding 9 to a portion of the bottom surface 9c, a portion of the top surface 9d, a portion of the first side surface 9e, and a portion of the second side surface 9f.

In this step, in forming the second external electrode 13, the first electrode portion 14 opposite in the width direction W to the protrusion 21a corresponding to the first protrusion 52a and included in the capacitor element 20 when viewed in the thickness direction T is formed on the first side surface 9e of the resin molding 9. The first electrode portion 14 includes the first electrode end 14a at a position in contact with the first side surface 9e of the resin molding 9 and closest to the first end surface 9a of the resin molding 9 in the length direction L. In this manner, the second external electrode 13 is formed in such a manner that while the first electrode portion 14 is formed, the region where the capacitor element 20 is opposite to the first electrode portion 14 in the width direction W includes a region (here, the first region AR1) where the distance W1 in the width direction W between the capacitor element 20 and the first electrode portion 14 is shorter than the distance W2 in the width direction W between the capacitor element 20 and the first electrode end 14a. In the first region AR1, the distance W1 in the width direction W between the capacitor element 20 and the first electrode portion 14 is constant in the length direction L.

The region where the capacitor element 20 is opposite to the first electrode portion 14 in the width direction W includes, in the length direction L, not only the first region AR1 at a position closer to the second end surface 9b of the resin molding 9 but also the second region AR2 at a position away from the second end surface 9b of the resin molding 9 and adjacent to the first region AR1 and including the first electrode end 14a. In the second region AR2, the distance in the width direction W between the capacitor element 20 and the first electrode portion 14 is constant in the length direction L. More specifically, the distance is constant and the same as the distance W2 in the width direction W between the capacitor element 20 and the first electrode end 14a.

In this step, in forming the second external electrode 13, the second electrode portion 15 opposite in the width direction W to the protrusion 21b corresponding to the second protrusion 52b and included in the capacitor element 20 when viewed in the thickness direction T is formed on the second side surface 9f of the resin molding 9. The second electrode portion 15 includes the second electrode end 15a at a position in contact with the second side surface 9f of the resin molding 9 and closest to the first end surface 9a of the resin molding 9 in the length direction L. In this manner, the second external electrode 13 is formed in such a manner that while the second electrode portion 15 is formed, the region where the capacitor element 20 is opposite to the second electrode portion 15 in the width direction W includes a region (here, the third region AR3) where the distance W3 in the width direction W between the capacitor element 20 and the second electrode portion 15 is shorter than the distance W4 in the width direction W between the capacitor element 20 and the second electrode end 15a. In the third region AR3, the distance W3 in the width direction W between the capacitor element 20 and the second electrode portion 15 is constant in the length direction L.

The region where the capacitor element 20 is opposite to the second electrode portion 15 in the width direction W includes, in the length direction L, not only the third region AR3 at a position closer to the second end surface 9b of the resin molding 9 but also the fourth region AR4 at a position away from the second end surface 9b of the resin molding 9 and adjacent to the third region AR3 and including the second electrode end 15a. In the fourth region AR4, the distance in the width direction W between the capacitor element 20 and the second electrode portion 15 is constant in the length direction L. More specifically, the distance is constant and the same as the distance W4 in the width direction W between the capacitor element 20 and the second electrode end 15a.

In this step, preferably, the second external electrode 13 is formed by at least one method selected from the group consisting of immersion coating, screen printing, transfer printing, inkjet printing, dispensing, spray coating, brush coating, drop casting, electrostatic coating, plating, and sputtering. Here, preferably, the second external electrode 13, more specifically, the resin electrode layer as the second external electrode 13, is formed using a conductive paste containing a conductive component and a resin component by immersion coating, screen printing, transfer printing, inkjet printing, dispensing, spray coating, brush coating, drop casting, or electrostatic coating.

The forming a first external electrode and the forming a second external electrode may be performed separately or simultaneously. When these steps are performed separately, the order is not limited.

Thus, the electrolytic capacitor 1a shown in FIG. 1, FIG. 2, and FIG. 3 is produced.

Embodiment 2

In the electrolytic capacitor of the present invention, the cathode may be connected to the second external electrode at the first side surface of the resin molding in the first region. In the electrolytic capacitor of the present invention, the cathode may be connected to the second external electrode at the second side surface of the resin molding in the third region. Such a case is described as an electrolytic capacitor of Embodiment 2 of the present invention. The electrolytic capacitor of Embodiment 2 of the present invention is the same as the electrolytic capacitor of Embodiment 1 of the present invention, except for the form of connection between the cathode and the second external electrode.

Figure 9:
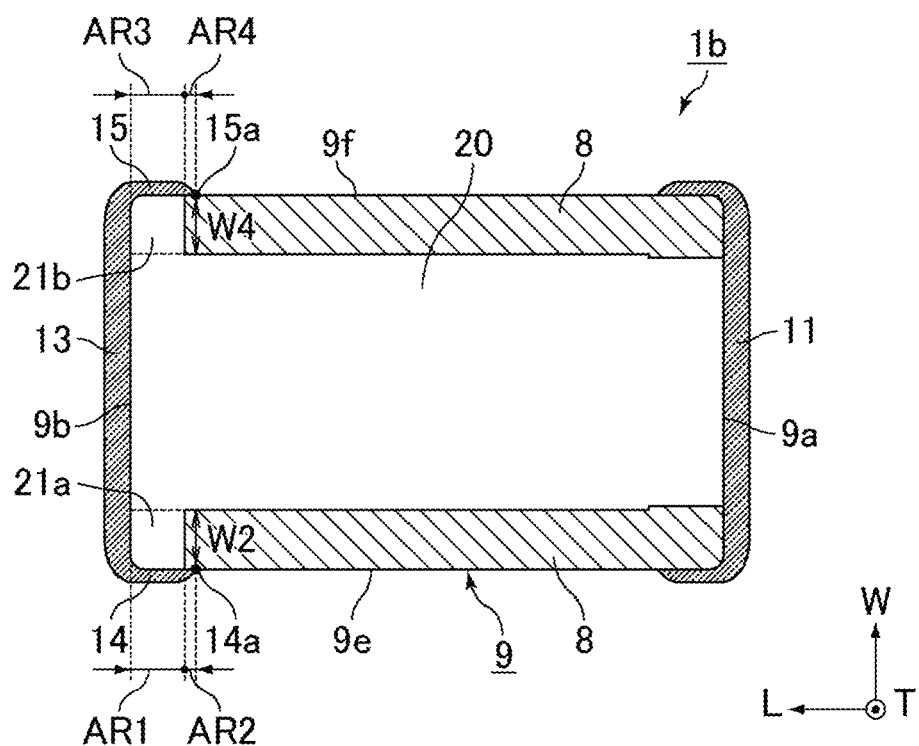
FIG. 9 is a schematic cross-sectional view showing an electrolytic capacitor of Embodiment 2 of the present invention.

FIG. 9 is a schematic cross-sectional view showing an electrolytic capacitor of Embodiment 2 of the present invention. In an electrolytic capacitor 1b shown in FIG. 9, in the first region AR1, the capacitor element 20 is connected to the second external electrode 13 (here, the first electrode portion 14) at the first side surface 9e of the resin molding 9. In other words, in the first region AR1, the distance W1 in the width direction W between the capacitor element 20 and the first electrode portion 14 is zero. Here, in the capacitor element 20, the cathode 7 is exposed at the first side surface 9e of the resin molding 9. Thus, in the first region AR1, the cathode 7 is connected to the second external electrode 13 at the first side surface 9e of the resin molding 9. This results in an increased effective area of the capacitor element 20, thus increasing the capacitance. The increased contact area between the capacitor element 20 (here, the cathode 7) and the second external electrode 13 improves the adhesion, resulting in higher reliability.

In the third region AR3, the capacitor element 20 is connected to the second external electrode 13 (here, the second electrode portion 15) at the second side surface 9f of the resin molding 9. In other words, in the third region AR3, the distance W3 in the width direction W between the capacitor element 20 and the second electrode portion 15 is zero. Here, in the capacitor element 20, the cathode 7 is exposed at the second side surface 9f of the resin molding 9. Thus, in the third region AR3, the cathode 7 is connected to the second external electrode 13 at the second side surface 9f of the resin molding 9. This increases the effective area of the capacitor element 20, thus increasing the capacitance. The increased contact area between the capacitor element 20 (here, the cathode 7) and the second external electrode 13 improves the adhesion, resulting in higher reliability.

As described above, the cathode 7 is connected to the second external electrode 13 not only at the second end surface 9b of the resin molding 9 but also at both the first side surface 9e and the second side surface 9f. As a result, the electrolytic capacitor 1b has a significantly larger effective area of the capacitor element 20 and thus has a significantly higher capacitance than the electrolytic capacitor 1a.

The cathode 7 may be connected to the second external electrode 13 not only at the second end surface 9b of the resin molding 9 but also optionally at one of the first side surface 9e and the second side surface 9f. In other words, the cathode 7 may be connected to the second external electrode 13 at the second end surface 9b and the first side surface 9e of the resin molding 9 or may be connected to the second external electrode 13 at the second end surface 9b and the second side surface 9f of the resin molding 9.

A method of producing the electrolytic capacitor of Embodiment 2 of the present invention, i.e., a method of producing the electrolytic capacitor 1b shown in FIG. 9, is the same as the method of producing the electrolytic capacitor of Embodiment 1 of the present invention, except that in the forming a resin molding, a resin molding is sealed by a sealing resin in such a manner that the anode is exposed at the first end surface and the cathode is exposed not only at the second end surface but also at the first side surface and the second side surface.

Embodiment 3

In the electrolytic capacitor of the present invention, in the region where the capacitor element is opposite to the first electrode portion in the width direction, the distance in the width direction between the capacitor element and the first electrode portion may decrease toward the second end surface of the resin molding in the length direction. In the electrolytic capacitor of the present invention, in the region where the capacitor element is opposite to the second electrode portion in the width direction, the distance in the width direction between the capacitor element and the second electrode portion may decrease toward the second end surface of the resin molding in the length direction. Such a case is described as an electrolytic capacitor of Embodiment 3 of the present invention. The electrolytic capacitor of Embodiment 3 of the present invention is the same as the electrolytic capacitor of Embodiment 2 of the present invention, except for the shape of the capacitor element.

Figure 10:
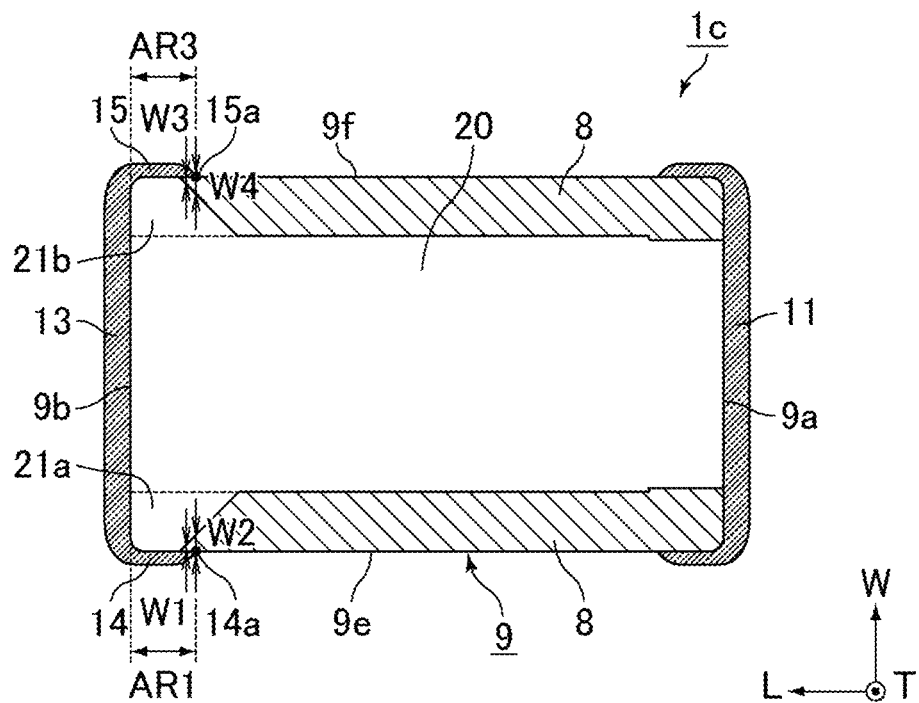
FIG. 10 is a schematic cross-sectional view showing an electrolytic capacitor of Embodiment 3 of the present invention.

FIG. 10 is a schematic cross-sectional view showing the electrolytic capacitor of Embodiment 3 of the present invention. In an electrolytic capacitor 1c shown in FIG. 10, in the region where the capacitor element 20 is opposite to the first electrode portion 14 in the width direction W, the distance W1 in the width direction W between the capacitor element 20 and the first electrode portion 14 decreases toward the second end surface 9b of the resin molding 9 in the length direction L. In other words, the region where the capacitor element 20 is opposite to the first electrode portion 14 in the width direction W includes only the first region AR1. This results in an increased effective area of the capacitor element 20, thus increasing the capacitance.

In the region where the capacitor element 20 is opposite to the first electrode portion 14 in the width direction W, it suffices as long as the distance W1 in the width direction W between the capacitor element 20 and the first electrode portion 14 decreases toward the second end surface 9b of the resin molding 9 in the length direction L. Such an embodiment includes an embodiment as shown in FIG. 10 in which the distance W1 in the width direction W between the capacitor element 20 and the first electrode portion 14 becomes zero on the way as it decreases toward the second end surface 9b of the resin molding 9 in the length direction L. When the distance W1 in the width direction W between the capacitor element 20 and the first electrode portion 14 becomes zero, the capacitor element 20 (here, the cathode 7) is connected to the second external electrode 13 not only at the second end surface 9b of the resin molding 9 but also at the first side surface 9e. In this case, the increased contact area between the capacitor element 20 (here, the cathode 7) and the second external electrode 13 improves the adhesion, resulting in higher reliability.

The distance W1 in the width direction W between the capacitor element 20 and the first electrode portion 14 may continue to decrease toward the second end surface 9b of the resin molding 9 in the length direction L.

The distance W1 in the width direction W between the capacitor element 20 and the first electrode portion 14 may linearly decrease toward the second end surface 9b of the resin molding 9 in the length direction L. In this case, the outer edge of the capacitor element 20 in the first region AR1 is defined by straight lines as shown in FIG. 10.

The distance W1 in the width direction W between the capacitor element 20 and the first electrode portion 14 may decrease either exponentially or logarithmically toward the second end surface 9b of the resin molding 9 in the length direction L. In this case, the outer edge of the capacitor element 20 in the first region AR1 is defined by curves. The outer edge of the capacitor element 20 in the first region AR1 may be defined by curves expressed by a specific function other than exponential and logarithmic functions or may be defined by curves that cannot be expressed by any specific function.

In the region where the capacitor element 20 is opposite to the second electrode portion 15 in the width direction W, the distance W3 in the width direction W between the capacitor element 20 and the second electrode portion 15 decreases toward the second end surface 9b of the resin molding 9 in the length direction L. In other words, the region where the capacitor element 20 is opposite to the second electrode portion 15 in the width direction W includes only the third region AR3. This increases the effective area of the capacitor element 20, thus increasing the capacitance.

In the region where the capacitor element 20 is opposite to the second electrode portion 15 in the width direction W, it suffices as long as the distance W3 in the width direction W between the capacitor element 20 and the second electrode portion 15 decreases toward the second end surface 9b of the resin molding 9 in the length direction L. Such an embodiment includes an embodiment as shown in FIG. 10 in which the distance W3 in the width direction W between the capacitor element 20 and the second electrode portion 15 becomes zero on the way as it decreases toward the second end surface 9b of the resin molding 9 in the length direction L. When the distance W3 in the width direction W between the capacitor element 20 and the second electrode portion 15 becomes zero, the capacitor element 20 (here, the cathode 7) is connected to the second external electrode 13 not only at the second end surface 9b but also at the second side surface 9f. In this case, the increased contact area between the capacitor element 20 (here, the cathode 7) and the second external electrode 13 improves the adhesion, resulting in higher reliability.

The distance W3 in the width direction W between the capacitor element 20 and the second electrode portion 15 may continue to decrease toward the second end surface 9b of the resin molding 9 in the length direction L.

The distance W3 in the width direction W between the capacitor element 20 and the second electrode portion 15 may linearly decrease toward the second end surface 9b of the resin molding 9 in the length direction L. In this case, the outer edge of the capacitor element 20 in the third region AR3 is defined by straight lines as shown in FIG. 10.

The distance W3 in the width direction W between the capacitor element 20 and the second electrode portion 15 may decrease either exponentially or logarithmically toward the second end surface 9b of the resin molding 9 in the length direction L. In this case, the outer edge of the capacitor element 20 in the third region AR3 is defined by curves. The outer edge of the capacitor element 20 in the third region AR3 may be defined by curves expressed by a specific function other than exponential and logarithmic functions or may be defined by curves that cannot be expressed by any specific function.

In the electrolytic capacitor 1c, the capacitor element 20 (here, the cathode 7) is connected to the second external electrode 13 not only at the second end surface 9b of the resin molding 9 but also at both the first side surface 9e and the second side surface 9f, but the capacitor element 20 (here, the cathode 7) may not be connected to the second external electrode 13 at the first side surface 9e or the second side surface 9f. In other words, similarly to the electrolytic capacitor 1a, the cathode 7 may be connected to the second external electrode 13 only at the second end surface 9b of the resin molding 9; may be connected to the second external electrode 13 at the second end surface 9b and the first side surface 9e of the resin molding 9; or may be connected to the second external electrode 13 at the second end surface 9b and the second side surface 9f of the resin molding 9.

The method of producing the electrolytic capacitor of Embodiment 3 of the present invention, i.e., the method of producing the electrolytic capacitor 1c shown in FIG. 10, is the same as the method of producing the electrolytic capacitor of Embodiment 2 of the present invention, except that in the forming a resin molding, the anode is formed in such a manner that the first protrusion has the same shape as that of the corresponding protrusion shown in FIG. 10 and the second protrusion has the same shape as that of the corresponding protrusion shown in FIG. 10.

EXAMPLES

Examples that more specifically disclose the electrolytic capacitor of the present invention are described below. In the following examples, a solid electrolytic capacitor is described as the electrolytic capacitor of the present invention. The present invention is not limited to these examples.

Example 1

A solid electrolytic capacitor of Example 1 was produced by the following method.
Forming Resin Molding
First, an aluminum chemical foil including aluminum foil as a valve-action metal substrate at a center thereof and an etched layer as a porous portion at a surface thereof was provided. Then, the aluminum chemical foil was cut by laser, whereby an anode having a structure shown in FIG. 4 was formed.

Next, the anode was immersed in an aqueous solution of ammonium adipate for anodization, whereby a dielectric layer was formed on a cut surface of the anode. The resulting structure was immersed in an aqueous dispersion of poly(3, 4-ethylenedioxythiophene) and then dried, whereby a solid electrolyte layer was formed on a surface of the dielectric layer. Further, the resulting structure was immersed in a carbon paste and then immersed in a silver paste, whereby a conductive layer in which a carbon layer and a silver layer were sequentially stacked on the surface of the solid electrolyte layer was formed. Thus, a capacitor element having a structure shown in FIG. 5 was formed.

Next, multiple capacitor elements were stacked, and the resulting stack of the capacitor elements was then sealed by a sealing resin containing an epoxy resin and silica particles, whereby a resin molding having a structure shown in FIG. 9 was formed.

Forming First External Electrode

The resin molding was immersed in the silver paste, whereby a first external electrode was formed to extend from a first end surface of the resin molding to a portion of a bottom surface, a portion of a top surface, a portion of a first side surface, and a portion of a second side surface of the resin molding.

Forming Second External Electrode

The resin molding was immersed in the silver paste, whereby a second external electrode was formed to extend from a second end surface of the resin molding to a portion of the bottom surface, a portion of the top surface, a portion of the first side surface, and a portion of the second side surface of the resin molding. Here, the second external electrode was formed to include a first electrode portion and a second electrode portion having structures shown in FIG. 9.

Thus, the solid electrolytic capacitor of Example 1 shown in FIG. 9 was produced.

Comparative Example 1

Figure 11:
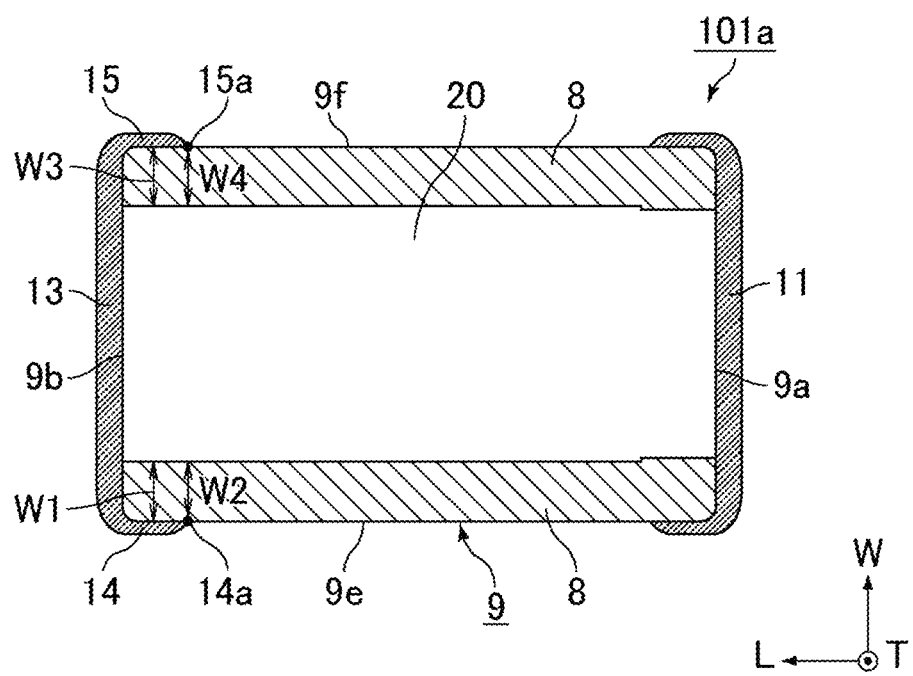
FIG. 11 is a schematic cross-sectional view showing a solid electrolytic capacitor of Comparative Example 1.

FIG. 11 is a schematic cross-sectional view showing a solid electrolytic capacitor of Comparative Example 1. The solid electrolytic capacitor of Comparative Example 1 was produced as in the solid electrolytic capacitor of Example 1, except that in the forming a resin molding, the aluminum chemical foil was cut in such a manner that the length in the width direction of the anode was constant in the length direction. In other words, as shown in FIG. 11, in a solid electrolytic capacitor 101a of Comparative Example 1 when viewed in the thickness direction T, in the region where the capacitor element 20 is opposite to the first electrode portion 14 in the width direction W, the distance W1 in the width direction W between the capacitor element 20 and the first electrode portion 14 was constant in the length direction L. More specifically, the distance was constant and the same as the distance W2 in the width direction W between the capacitor element 20 and the first electrode end 14a. In the region where the capacitor element 20 is opposite to the second electrode portion 15 in the width direction W, the distance W3 in the width direction W between the capacitor element 20 and the second electrode portion 15 was constant in the length direction L. More specifically, the distance was constant and the same as the distance W4 in the width direction W between the capacitor element 20 and the second electrode end 15a.

Comparative Example 2

Figure 12:
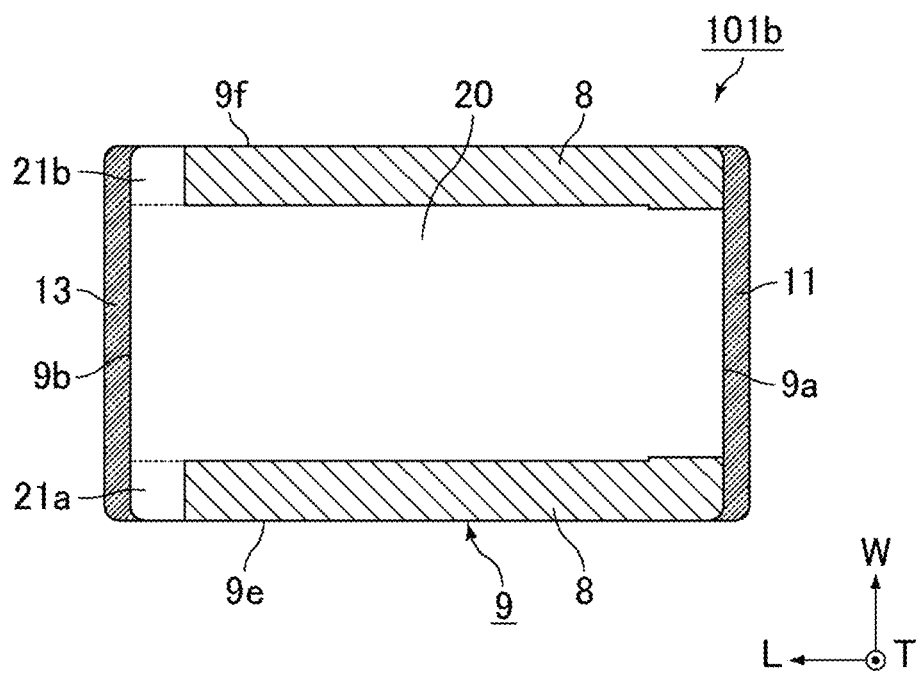
FIG. 12 is a schematic cross-sectional view showing a solid electrolytic capacitor of Comparative Example 2.

FIG. 12 is a schematic cross-sectional view showing a solid electrolytic capacitor of Comparative Example 2. The solid electrolytic capacitor of Comparative Example 2 was produced in the same manner as the solid electrolytic capacitor of Example 1, except that in the forming a first external electrode, the first external electrode was formed only on the first end surface of the resin molding, and in the forming a second external electrode, the second external electrode was formed only on the second end surface of the resin molding. In other words, as shown in FIG. 12, in a solid electrolytic capacitor 101b of Comparative Example 2, the capacitor element 20 (here, the cathode 7) was exposed at the first side surface 9e and the second side surface 9f of the resin molding 9.

Evaluation

The solid electrolytic capacitors of Example 1, Comparative Example 1, and Comparative Example 2 were evaluated as follows. Table 1 shows the results.

Capacitance

The capacitance of the solid electrolytic capacitor of each example was measured.

High Temperature Test

The solid electrolytic capacitor of each example was left to stand at a temperature of 105° C. for 1000 hours for a high temperature test. Changes in equivalent series resistance (ESR) induced by the high temperature test were determined as a ratio of "ESR after high temperature test"/"ESR before high temperature test".

High Humidity Test

The solid electrolytic capacitor of each example was left to stand at a temperature of 60° C. and a humidity of 93% for 1000 hours for a high humidity test. Changes in ESR induced by the high humidity test were determined as a ratio of "ESR after high humidity test"/"ESR before high humidity test".

TABLE 1

|  | Capacitance (μF) | Changes in ESR induced by high temperature test | Changes in ESR induced by high humidity test |
|---|---|---|---|
| Example 1 | 330 | 1.2 | 1.1 |
| Comparative Example 1 | 315 | 1.2 | 1.1 |
| Comparative Example 2 | 330 | 3.6 | 4.5 |

As shown in Table 1, in the solid electrolytic capacitor of Example 1, the changes in ESR induced by the high temperature test and the high humidity test were comparable to those in the solid electrolytic capacitor of Comparative Example 1, and the capacitance was higher.

As shown in Table 1, in the solid electrolytic capacitor of Example 1, the capacitance was comparable to that of the solid electrolytic capacitor of Comparative Example 2, and the changes in ESR induced by the high temperature test and the high humidity test were smaller. In other words, the solid electrolytic capacitor of Example 1 was less affected by external environments such as a high temperature environment and a high humidity environment and provided high adhesion between the cathode and the second external electrode, thus achieving high reliability.

The above shows that the solid electrolytic capacitor of Example 1 can have a higher capacitance while ensuring reliability.

REFERENCE SIGNS LIST 1a, 1b, 1c electrolytic capacitor
3 anode
3a valve-action metal substrate
3b porous portion
5 dielectric layer
7 cathode
7a solid electrolyte layer
7b conductive layer 8 sealing resin
9 resin molding
9a first end surface of resin molding
9b second end surface of resin molding
9c bottom surface of resin molding
9d top surface of resin molding
9e first side surface of resin molding
9f second side surface of resin molding
11 first external electrode
13 second external electrode
14 first electrode portion
14a first electrode end
15 second electrode portion
15a second electrode end
20 capacitor element
21a, 21b protrusion
30 stack
51 main portion
52a first protrusion
52b second protrusion
101a, 101b solid electrolytic capacitor
AR1 first region
AR2 second region
AR3 third region
AR4 fourth region
L length direction
T thickness direction
W width direction
W1 distance in width direction between capacitor element and first electrode portion
W2 distance in width direction between capacitor element and first electrode end
W3 distance in width direction between capacitor element and second electrode portion
W4 distance in width direction between capacitor element and second electrode end
Wa maximum length in width direction of capacitor element in region where capacitor element is opposite to second external electrode in width direction
Wb maximum length in width direction of capacitor element in region where capacitor element is not opposite to second external electrode in width direction

The invention claimed is:

1. An electrolytic capacitor comprising:
a resin molding that includes:
   a capacitor element including an anode having a porous portion at a surface thereof, a dielectric layer on a surface of the porous portion, and a cathode opposite to the anode via the dielectric layer,
   a sealing resin sealing the capacitor element,
   a first end surface and a second end surface opposite to each other in a length direction of the resin molding, and
   a first side surface and a second side surface opposite to each other in a width direction perpendicular to the length direction of the resin molding;
a first external electrode on the first end surface and connected to the anode exposed at the first end surface of the resin molding; and
a second external electrode connected to the cathode exposed at the second end surface of the resin molding,
wherein
the second external electrode further includes a first electrode portion extending on the first side surface of the resin molding,
the first electrode portion includes a first electrode end at a position in contact with the first side surface of the resin molding and closest to the first end surface of the resin molding in the length direction of the resin molding,
when viewed in a thickness direction perpendicular to the length direction and the width direction, in a region where the anode of the capacitor element is opposite to the first electrode portion in the width direction, the anode includes a main portion extending in the length direction and a first protrusion protruding from the main portion in the width direction, and
when viewed in the thickness direction, a region where the capacitor element including the first protrusion is opposite to the first electrode portion in the width direction includes a first region where a distance in the width direction between the capacitor element and the first electrode portion is shorter than a distance in the width direction between the capacitor element and the first electrode end.

2. The electrolytic capacitor according to claim 1,
wherein the region where the capacitor element is opposite to the first electrode portion in the width direction includes, in the length direction, the first region at a position closer to the second end surface of the resin molding and a second region at a position away from the second end surface of the resin molding and adjacent to the first region and including the first electrode end,
in the first region, the distance in the width direction between the capacitor element and the first electrode portion is constant in the length direction, and
in the second region, the distance in the width direction between the capacitor element and the first electrode portion is constant in the length direction.

3. The electrolytic capacitor according to claim 1, wherein in the region where the capacitor element is opposite to the first electrode portion in the width direction, the distance in the width direction between the capacitor element and the first electrode portion decreases toward the second end surface of the resin molding in the length direction.

4. The electrolytic capacitor according to claim 1, wherein the cathode is connected to the second external electrode at the first side surface of the resin molding in the first region.

5. The electrolytic capacitor according to claim 1,
wherein the second external electrode further includes a second electrode portion extending on the second side surface of the resin molding,
the second electrode portion includes a second electrode end at a position in contact with the second side surface of the resin molding and closest to the first end surface of the resin molding in the length direction of the resin molding, and
when viewed in the thickness direction, a region where the capacitor element is opposite to the second electrode portion in the width direction includes a third region where a distance in the width direction between the capacitor element and the second electrode portion is shorter than a distance in the width direction between the capacitor element and the second electrode end.

6. The electrolytic capacitor according to claim 5,
wherein the region where the capacitor element is opposite to the second electrode portion in the width direction includes, in the length direction, the third region at a position closer to the second end surface of the resin molding and a fourth region at a position away from the second end surface of the resin molding and adjacent to the third region and including the second electrode end, in the third region, the distance in the width direction between the capacitor element and the second electrode portion is constant in the length direction, and in the fourth region, the distance in the width direction between the capacitor element and the second electrode portion is constant in the length direction.

7. The electrolytic capacitor according to claim 5, wherein in the region where the capacitor element is opposite to the second electrode portion in the width direction, the distance in the width direction between the capacitor element and the second electrode portion decreases toward the second end surface of the resin molding in the length direction.

8. The electrolytic capacitor according to claim 5, wherein the cathode is connected to the second external electrode at the second side surface of the resin molding in the third region.

9. The electrolytic capacitor according to claim 1, wherein a maximum length in the width direction of the capacitor element in a region where the capacitor element is opposite to the second external electrode in the width direction is greater than a maximum length in the width direction of the capacitor element in a region where the capacitor element is not opposite to the second external electrode in the width direction.

10. The electrolytic capacitor according to claim 1, wherein the cathode has an outer edge extending along an outer edge of the anode when viewed in the thickness direction.

11. The electrolytic capacitor according to claim 1, wherein the second external electrode includes a resin electrode layer containing a conductive component and a resin component.

12. The electrolytic capacitor according to claim 11, wherein the cathode includes the resin electrode layer.

13. A method of producing an electrolytic capacitor, the method comprising:

forming a capacitor element by sequentially forming a dielectric layer and a cathode on a surface of a porous portion of an anode having a shape with a main portion thereof extending in a length direction of the anode and a first protrusion protruding from the main portion in a width direction of the anode perpendicular to the length direction;

sealing the capacitor element with a sealing resin to form a resin molding having a first end surface and a second end surface opposite to each other in the length direction of the resin molding, and a first side surface and a second side surface opposite to each other in the width direction of the resin molding;

forming a first external electrode on the first end surface of the resin molding and connected to the anode exposed at the first end surface; and forming a second external electrode extending from the second end surface of the resin molding to a portion of the first side surface and connected to the cathode exposed at the second end surface, wherein the second external electrode is formed in such a manner that a first electrode portion opposite in the width direction to the first protrusion in the capacitor element is formed on the first side surface of the resin molding so that the first electrode portion includes a first electrode end at a position in contact with the first side surface of the resin molding and closest to the first end surface of the resin molding in the length direction, a region where the anode of the capacitor element is opposite to the first electrode portion in the width direction, the anode includes a main portion extending in the length direction and a first protrusion protruding from the main portion in the width direction when viewed in a thickness direction perpendicular to the length direction and the width direction of the resin molding, and a region where the capacitor element including the first protrusion is opposite to the first electrode portion in the width direction includes a first region where a distance in the width direction between the capacitor element and the first electrode portion is shorter than a distance in the width direction between the capacitor element and the first electrode end when viewed in the thickness direction.

14. The method of producing an electrolytic capacitor according to claim 13, wherein the anode has a shape including a second protrusion protruding from the main portion to a side thereof away from the first protrusion in the width direction, and the second external electrode is formed in such a manner that a second electrode portion opposite in the width direction to the second protrusion in the capacitor element is formed on the second side surface of the resin molding so that the second electrode portion includes a second electrode end at a position in contact with the second side surface of the resin molding and closest to the first end surface of the resin molding in the length direction, and a region where the capacitor element is opposite to the second electrode portion in the width direction includes a second region where a distance in the width direction between the capacitor element and the second electrode portion is shorter than a distance in the width direction between the capacitor element and the second electrode end when viewed in the thickness direction of the resin molding.

15. The method of producing an electrolytic capacitor according to claim 13, wherein the second external electrode is formed by at least one method selected from the group consisting of immersion coating, screen printing, transfer printing, inkjet printing, dispensing, spray coating, brush coating, drop casting, electrostatic coating, plating, and sputtering.

\* \* \* \* \*